Figure 4:
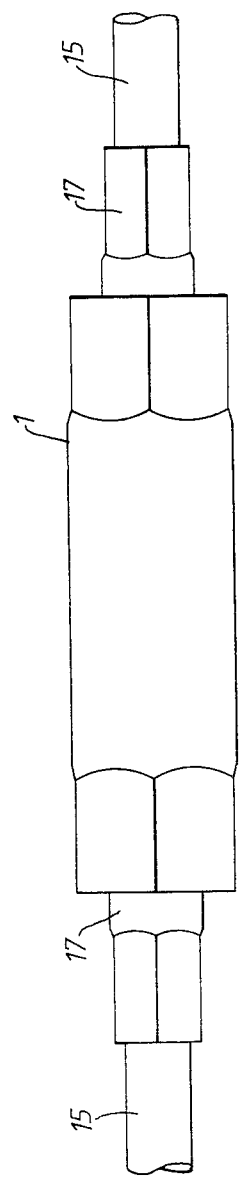

United States Patent [19]

Kershaw

[11] Patent Number: 4,773,728
[45] Date of Patent: Sep. 27, 1988

[54] METHOD FOR OPTICAL FIBRE SPLICE PROTECTION

[75] Inventor: Alan Kershaw, Wollaton, England

[73] Assignee: Plessey Overseas Limited, Ilford, England

[21] Appl. No.: 876,538

[22] Filed: Jun. 20, 1986

[30] Foreign Application Priority Data

Jun. 28, 1985 [GB] United Kingdom ............... 8516386

[51] Int. Cl.$^4$ ............................................. G02B 6/38
[52] U.S. Cl. ................................. 350/96.21; 350/320
[58] Field of Search ............... 350/96.20, 96.21, 96.22, 350/96.23, 320

[56] References Cited

U.S. PATENT DOCUMENTS

| 3,972,585 | 8/1976 | Dalgleish et al. | 350/96.21 |
| 4,348,076 | 9/1982 | Oldham | 350/96.22 |
| 4,585,304 | 4/1986 | Winter et al. | 350/96.21 |
| 4,676,589 | 6/1987 | Miyashita et al. | 350/96.21 |

FOREIGN PATENT DOCUMENTS

| 0025013 | 3/1981 | European Pat. Off. |
| 0025012 | 3/1981 | European Pat. Off. |
| 0112072 | 6/1984 | European Pat. Off. |
| 0120634 | 10/1984 | European Pat. Off. |
| 3005918 | 9/1981 | Fed. Rep. of Germany | 350/96.21 |
| 52-64942 | 5/1977 | Japan | 350/96.21 |
| 60-21010 | 2/1985 | Japan | 350/96.21 |
| 1512095 | 5/1978 | United Kingdom. |
| 2144592 | 3/1985 | United Kingdom. |
| 2148537 | 5/1985 | United Kingdom. |

Primary Examiner—John Lee
Attorney, Agent, or Firm—Michael F. Oglo; Julian C. Renfro

[57] ABSTRACT

An optical fibre splice assembly having a pair of spigots and a sleeve, the sleeve having an internal bore of dimension large enough to permit retraction of the sleeve over at least one of the spigots, each spigot having a bore to accomodate an optical fibre adapted to be secured to an optical fibre cable through its coverings. A method for producing such an assembly is also disclosed comprising the steps of:

attaching optical cables to spigots;
passing optical fibres through a bore in each spigot;
retracting a sleeve over one spigot;
splicing together the optical fibres;
returning the sleeve over the spigots;
tensioning the spliced optical fibers; and then, fixing the sleeve to both spigots.

2 Claims, 2 Drawing Sheets

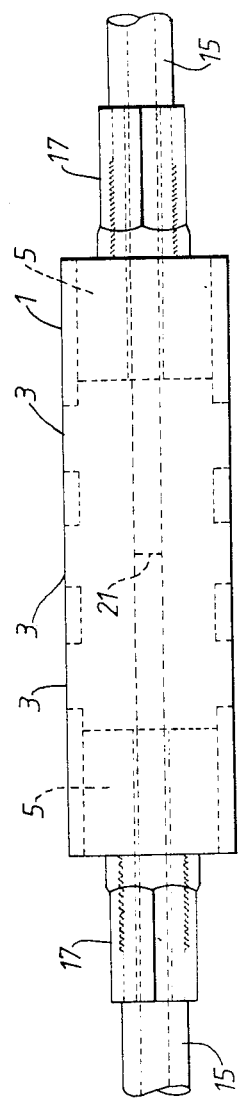

METHOD FOR OPTICAL FIBRE SPLICE PROTECTION

This invention relates to the splicing of optical fibres, and more particularly to protective assemblies therefor.

Normal methods of connecting optical fibres include rack board mounting and "piggy-back" arrangement. Both methods rely upon support or reinforcing members to protect the relatively fragile optic fibre junction. In the rack board mounting method, fixed input and output fibres are held on the rack board together with a mirror or similar device for providing optical continuity. In the "piggy-back" arrangement, the two optical fibres are fusion spliced and have a reinforcing member abutting and parallel therewith, fixed to give support. These methods are expensive both in terms of cost and space and the assemblies provided are still susceptable to damage during installation and operation.

The present invention is intended to provide a strong optical fibre splice protective assembly which will protect the optical fibre splice from both tensile stress and "knock" damage while remaining relatively inexpensive, and adaptable to allow the connection of various types of optical fibre cable.

According to the present invention there is provided an assembly, for optical fibre splice protection, comprising a pair of spigots; and,
a sleeve;
the sleeve having an internal bore of dimension large enough to permit retraction of the sleeve over at least one of said pair of spigots;
each spigot including a bore dimensioned large enough to accept an optical fibre;
each spigot being adapted for securing to the covering of an optical-fibre cable.

Conveniently, there is provided an assembly as aforesaid, wherein each spigot is of stepped structure, each comprising a main body and an extension of smaller cross-section, said extension providing means for securing the covering of an optical-fibre cable. This main body may be, in each case, fixedly attached within said sleeve by means of crimping, threading, adhesive, solder or brazing. The extension and cable covering may be attached by adhesive, friction or by means of a mechanical detent. In preference to the foregoing, a crimping member of outer dimension smaller than the main body, may be utilised. The cavity in the sleeve may be filled with an elastomeric material to protect further the spliced optical fibres.

A method for providing optical-fibre splice protection, is also provided, comprising the following steps:

attaching a pair of optical fibre cables to a pair of respective spigots, the optical fibre of each cable passing through a bore in the respective spigot, each cable being attached to its respective spigot by the fibre covering; retracting a sleeve over one of said spigots; splicing together the two exposed portions of optical fibre; returning the sleeve over said one spigot; adjusting the tension on the spliced fibres and fixing the sleeve to both spigots.

The sleeve member is preferably filled with an elastomeric material after the sleeve is fixed to the spigots.

An embodiment of the present invention will now be described, by way of example only, with reference to the accompanying drawings wherein:

FIG. 1 is an exploded cross-section of the present optical fibre splice assembly; and, FIGS. 2 to 5 show, in plan view, stages of the present optical fibre fabrication.

Referring to FIG. 1, there is shown a sleeve 1 constructed of any suitable metal or plastic, with observation orifices 3. This co-operates with spigots 5, also constructed of any suitable metal or plastic, each having a stepped construction with a central bore 7 to accomodate an optical fibre. A first part 9 of each spigot 5 is adapted to fit into the sleeve 1 while a second part 11 is continous with the first but of a much smaller diameter and with a portion of its length roughened, for example, with a screw thread 13.

FIG. 2 illustrates the optical fibre cables crimped into the spigots 5. A length of cable 15 is stripped of its coverings and pushed through the central bore 7 of the spigot 5 until the second part 11 of the spigot 5 abuts the covering. A crimping element 17 is then brought up the cable 15 to locate over the spigot 5 roughened portion 13 and a portion of the covered cable 15. Crimping element 17 is then crimped onto the spigot 5 to secure the cable 15 to the spigot 5. It may be possible to achieve an even stronger connection of the cable 15 and spigot 5 by pushing a portion of the cable covering over the second part 11 of the spigot 5. The neccesity for a crimping element 17 can be relieved by using alternative fixing means such as adhesives, brazing or soldering, for example.

Once the spigots 5 are attached to their respective cable ends, the sleeve 1 is retracted over one of the spigots 5 in preparation for a later securing operation. The optical fibres 19 are then connected in an optically continous manner or to an opticaldevice such as a filter or attenuator. The sleeve 1 is now returned back over the spigots 5 creating a bridge between them, as shown in FIG. 3. The position 4 of the optical fibre junction and the tension of the fibres 19 can then be adjusted under observation through orifices 3, before the sleeve 1 is crimped to the spigots 5 as shown in FIG. 4. Once crimping is completed the optical fibre junction 21 can be protected further by the injection of an elastomeric compound through the orifices 3 to fill the tubular sleeve body 1.

Figure 5:
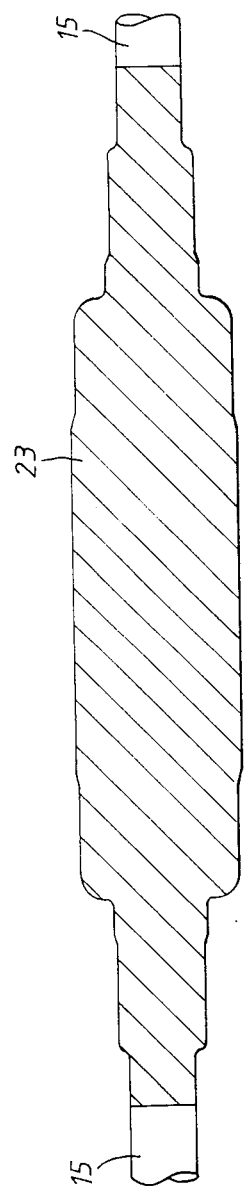

A cover member 23 can then be placed over the whole splice to give electrical insulation and additional environmental protection as shown in FIG. 5.

Various types of optical fibre cable 15 can be accomodated by adaptation of the spigot members 5 to take consideration of packing materials such as 'Kelvar' and variable cable coating thicknesses. Thus two different types of optical fibre cable can be joined by having an appropriately tailored spigot 5 crimped into a common tubular body 1.

As the splice is secured principally by the optical fibre coatings no additional strain is placed on the optical fibre junction 21 itself and the splice is resilient to imposed axial tension.

It will be noted that the crimping process could be replaced by application of adhesives, by welding, soldering, brazing or other fixing means.

We claim:

1. A method, for providing optical fibre splice protection, comprising the following steps:
attaching a pair of optical fibre cables to a pair of respective spigots, the optical fibre of each cable being covered by a covering and passing through a bore in the respective spigot, each cable being attached to its respective spigot through its covering, retracting a sleeve over one of said spigots, splicing together the two exposed portions of optical fibre; returning the sleeve over said spigot, adjusting the optical fibre splice tension, and fixing the sleeve to both spigots by crimping the sleeve to each spigot.

2. A method for providing optical-fibre splice protection as claimed in claim 1 wherein after the sleeve is fixed to both spigots, the cavity inside the sleeve is filled with elastomeric material.

* * * * *